Figure 1:
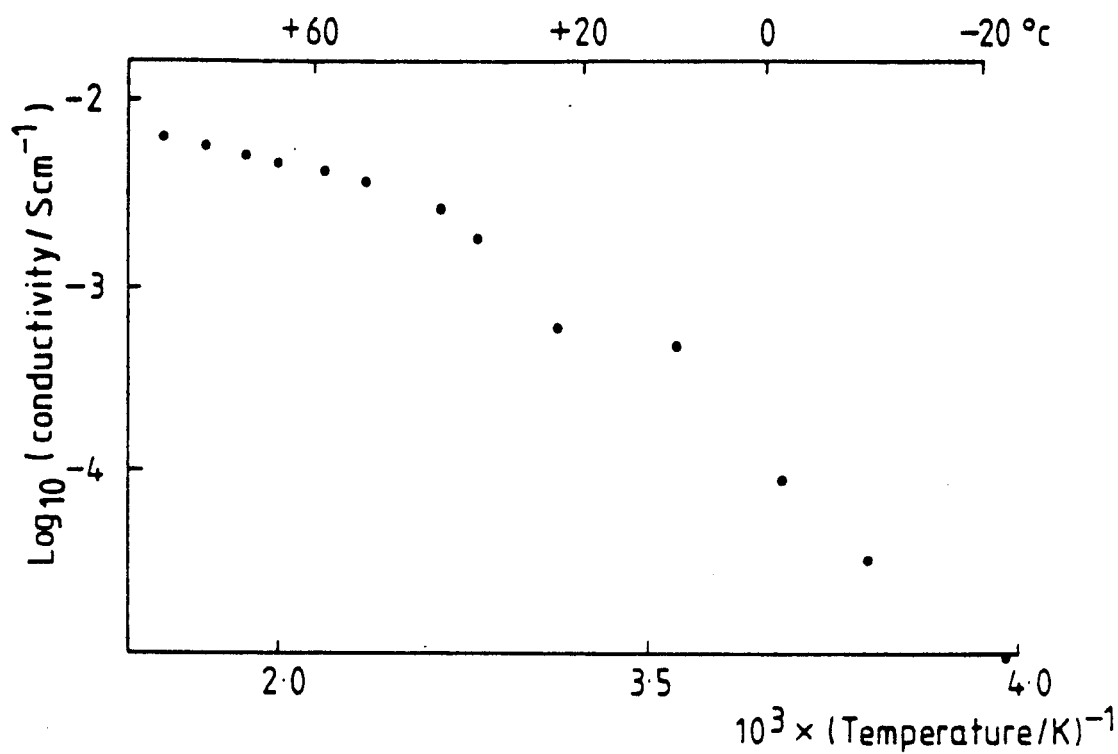

United States Patent [19]

Giles

[11] Patent Number: 5,041,346

[45] Date of Patent: Aug. 20, 1991

[54] ION CONDUCTORS

[75] Inventor: Jeremy R. M. Giles, Worthing, England

[73] Assignee: Secretary of State for Defence in her Britannic Majesty's Government of U.K., London, United Kingdom

[21] Appl. No.: 460,867

[22] PCT Filed: Jul. 14, 1988

[86] PCT No.: PCT/GB88/00565

§ 371 Date: Feb. 5, 1990

§ 102(e) Date: Feb. 5, 1990

[87] PCT Pub. No.: WO89/00771

PCT Pub. Date: Jan. 26, 1989

[30] Foreign Application Priority Data

Jul. 14, 1987 [GB] United Kingdom ............... 8716559

[51] Int. Cl.$^5$ .......................................... H01M 10/40
[52] U.S. Cl. ................................ 429/192; 252/62.2
[58] Field of Search .................. 429/192; 252/62.2

[56] References Cited

U.S. PATENT DOCUMENTS 4,471,037 9/1984 Bannister .................. 429/192 X
4,840,856 6/1989 Nakacho ...................... 429/192
4,886,716 12/1989 Roggero et al. ............... 429/192

FOREIGN PATENT DOCUMENTS 78505 5/1983 European Pat. Off. ......... 429/192
2568574 2/1986 France ........................... 429/192
2164047 3/1986 United Kingdom ........... 429/192

Primary Examiner—Stephen J. Kalafut
Attorney, Agent, or Firm—Nixon & Vanderhye

[57] ABSTRACT

An ion conducting polymeric material characterized in that it comprises a mixture of at least three components (a), (b), and (c): (a) one or more structural materials, (b) one or more low mass plasticizers, and (c) one or more amorphous ion-solvating polymers and optionally containing (d) one or more ionic salts. Preferably the structural material is poly(ethylene oxide) and the ion-solvating polymer is an oxymethylene linked polyethylene glycol having a repeat sequence $[(CH_2CH_2O)_aCH_2O]$ where a has an average value of 4 to 15.

9 Claims, 3 Drawing Sheets

ION CONDUCTORS

This invention relates to polymeric electrolytes, methods of making these, and to their use in electrolytic cells and batteries of such cells.

Solid polymeric electrolytes have been investigated in recent years as alternatives to liquid electrolytes in batteries as their use allows greater flexibility in battery design and manufacture. The most widely studied material for this application has been high molar mass poly(ethylene oxide) ("PEO") combined with a dissolved salt to enhance conductivity.

The polymer PEO is able to form stable solvates with a number of salts, however the electrical and morphological properties of such electrolytes require improvement before they are suitable for use in cells which operate effectively at or about room temperature. In particular high molar mass PEO tends to crystallise at about 65° C. considerably reducing the content of the amorphous component needed for high ion conductivity.

Recent advances, e.g. as described in UK patent application GB-2164047A have attempted to overcome this disadvantage of PEO whilst retaining an essentially oxyethylene-based polymer, by modification of the PEO structure such that crystallinity at ambient temperatures is essentially moved. In GB-2164 047A linking groups eg $(CH_3)SiO$ and $CH_2O$ ('oxymethylene') are introduced between short sequences of oxyethylene groups, thereby disrupting the PEO backbone so that crystallisation is inhibited.

The polymeric electrolytes described in GB-216047A typically have conductivities at 25° C. of $10^{-4}$ to $10^{-5}$ S cm$^{-1}$.($\Omega^{-1}$ cm$^{-1}$), a considerable improvement over PEO itself. These conductivities are appropriate for certain battery applications, particularly where the electrolyte is in the form of a thin film, e.g. 50 μm thick, thereby permitting the relatively low current densities over a higher active surface area and maintaining the required overall current needed for the device.

The present invention seeks to improve the current densities that may be carried by a polymer-based electrolyte at ambient temperatures by increasing the conductivity of the electrolyte and altering its temperature dependence, particularly at a low temperatures (e.g. less than 0° C.), this latter being an important object of this invention.

According to the present invention an ion-conducting polymeric material comprises a mixture of at least three components (a), (b) and (c):

(a) one or more structural materials (b) one or more low mass plasticizers, and (c) one or more amorphous ion-solvating polymers The material may also contain a fourth component (d) one or more ionic salts.

Preferably the polymeric material contains only one structural material.

The structural material(s) (a) primarily provide mechanical support for the polymeric material of the invention, and is/are preferably polymer(s), which may be natural or synthetic, thermosetting or thermoplastic. The structural materials may themselves be ion-solvating, and examples of structural materials are the polymers poly(ethylene oxide) i.e. 'PEO' preferably of molar mass range $1 \times 10^6$ to $5 \times 10^6$, epoxy resins, polyurethanes and polyvinylchloride.

The plasticiser(s) is/are preferably also ion-solvating and should be compatible with other polymer(s) in the polymeric material, particularly with component (c). Preferred plasticisers are dipolar aprotic solvents such as acetonitrile, γ-butyrlacetone, dioxolane, 2-methyltetrahydrofuran, tetrahydrofuran, dimethyl sulfhoxide, low molar mass polyethylene glycol (e.g., of molar mass 300–500 especially ca 400) or derivatives thereof, and in particular alkylene carbonates such as propylene carbonate and ethylene carbonate.

The ion-solvating polymers (c) are those polymers which contain $(CH_2CH_2O)$ units in their repeat units, in particular those described in GB-2164047A. These include:

(i) graft copolymers having amorphous sidechains which contain the unit $(CH_2CH_2O)_k$ where k has an average value between 3 and 20 and the mainchain is selected from a carbon-carbon or siloxane or a phosphazene backbone, where there may be a linkage group between the sidechain and the backbone which may be selected from known common groups including ester, alkane, oxyalkane and combinations thereof.

(ii) siloxane linked polyethylene glycols having a repeat unit $B((OCH_2CH_2)_1)_m$ where B is $-OSi(CH_2)_2-$ and has an average value of 4 to 9 and m is 1, B is $(-O_{3/2}Si(CH_3)-$ and has an average value of 4 to 9 and m is 3/2.

(iii) oxymethylene linked polyethylene glycols having a repeat unit $(CH_2CH_2O)_a CH_2O$ where a has an average value of 4 to 10, preferably 4 to 9, especially of about 9, a preferred molar mass being $1 \times 10^5$ to $6 \times 10^5$, e.g., $2.5 \times 10^5$ to $3.5 \times 10^5$ (iv) polymers which are a combination of two or more of the above types of polymer Provided that when the polymers are of the type (iii) the structural material is polyethylene glycol In such polymers (i) to (iv) the variable a is generally an average of a narrow distribution range. Components (b) and (c) separately and/or together provide a highly conducting medium for ions present in the polymeric material, e.g. already present or as formed by ionisation of the salt (d) when present.

The salt (d), when included, enhances the conductivity of the polymeric material. The salt should be compatible with the desired electrode processes and electrode materials.

Lithium salts are for example preferred where lithium metal oxidation and lithium ion reduction forms the desired anode electrochemical reaction. The inclusion of more than one salt may further enhance the conductivity of the polymeric material, improve the electrode processes and improve the morphological behaviour of the polymeric material. Suitable cations in the salt are metal ions or stable cationic complex ions. Preferred salts are those of alkali metals, especially Li and Na, the alkaline earths, especially calcium and magnesium, nickel$^{2+}$, zinc$^{2+}$, mercury$^{3+}$, ammonium and alkyl or aryl ammonium cations. The anion may be any known compatible anion, particularly those found in electrolytes such as $ClO_4^-$, $CF_3SO_3^-$, $PF_6^-$, $AsF_6^-$, $AlCl_4^-$, $BPh_4^-$, $BF_4^-$, $I^-$, $SCN^-$, $CF_3CO_2^-$, $CF_3(CF_2)_nSO_3^-$, and $CF_3(CF_2)_nCO_2^-$ where n is an integer, or other strong acid anions. Preferred salts are $LiCF_3SO_3$, $LiClO_4$, $LiPF_6$ and $LiAsF_6$.

It may in some cases be useful for the material to contain two or more salts, e.g. a Lithium salt plus another salt. The relative proportions of components (a), (b), (c) and when present (d) in the material are variable within broad limits, but none of the components should constitute more than 75% by weight of the whole material. Typically but not exclusively a structural polymer a may comprise 10-35 mole %, the plasticiser b 10-50 mole %, the ion solvating polymer c 30-70 mol % of the mixture of a, b and c. When PEO is used as a structural polymer and $Li^+$ as a cation a suitable range for the ion-solvating content of the electrolyte: Li ratio is 10:1 to 40:1, this range being typical but not exclusive.

In the polymeric material the components (a), (b), (c) and (d) may form a physical mixture. It is improbable and undesirable that the components should form a single homogeneous phase. The details of phase separation will depend on the choice of components and their relative quantities. It is preferred that a highly ion conducting phase is formed which is maintained over the working temperature range of operation. A structurally supporting phase or phases should also be generated. It may be desirable that there is covalent bonding between components so that the microscopic structure of the material is stabilised into a preferred morphology.

Fillers such as alumina or glass micro-spheres may also be mixed with polymeric materials of the invention to improve the properties for particular applications. The use of plasticisers to enhance the ion conducting properties of a polymeric electrolyte such as high molar mass PEO is known, but such blends suffer from the problems of kinetic instability at ambient temperatures, leading to recrystallisation. Blends of PEO with poly (ethylene glycol) (PEG) of molar mass 400 and derivatives thereof have been described e.g. Kelly et al, J Electroanal Chem (1984), 168, 467, but do not adequately overcome such disadvantages.

By the use of the three or four components in this invention, the problems of kinetic instability and recrystallisation may be reduced. The combination of component (c) and the plasticiser (b) is additionally expected to maintain an amorphous conducting phase. The range of bulk ionic conductivities achieved and their temperature dependence are significantly improved, so that the polymeric materials of the invention become readily compatible with battery thin-film electrolytic requirements.

Polymeric materials of the invention may be made simply by mixing the components (a), (b), (c) and when present (d) in a suitable solvent, e.g. acetone under an inert atmosphere. The solvent may then be removed e.g. by evaporation. By casting the solution into a suitable mould, or onto a surface to form a film, and allowing evaporation, the polymeric material may be formed in any suitable shape. Any alternative route to electrolyte fabrication may be employed, common to those skilled in the art of polymer materials forming and manufacture. Covalent bonding, e.g. cross-linking between the components may be achieved by conventional methods, e.g. the stimulus of radiation or heat, with or without the presence of an activator, initiator or other added reagent.

According to the present invention in a second aspect there is provided an electrolytic cell comprising an anode, a cathode and an electrolyte between the two characterised in that the electrolyte comprises a polymer electrolyte according to the first aspect of the invention.

According to the present invention in a third aspect there is provided a battery comprising a plurality of cells according to the second aspect connected in series or in parallel. Electrolytic cells and batteries embodying the second and third aspects may be manufactured in known ways. They may be either primary or secondary (rechargeable) cells or batteries for a variety of uses, e.g. electric vehicles, computer memory back-up power sources, heart pacemakers and integrated power sources for printed circuit boards.

Batteries may be produced with the cells connected in series or in parallel (or a combination of the two) depending on whether maximum voltage or maximum current is required as an output.

As the thickness of the cells which may be produced from polymer electrolytes can be extremely small, compared with the contact surface area of the cell components, it is possible to incorporate many cells, e.g. up to 1000 or more, in a compact battery structure.

Figure 6:
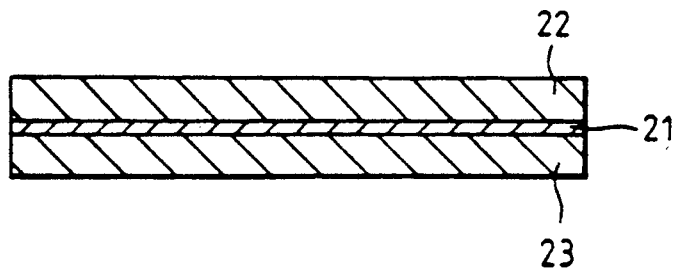

The invention will now be described by way of example only with reference to FIGS. 1-5 showing graphs of $Log_{10}$(conductivity) vs. $1000 \times 1/$ temperature (°K.) for polymeric materials of the invention, and FIG. 6 showing a cross section of an electrolytic cell embodying the invention.

EXAMPLE 1

A polymeric material was prepared having the following four components:
(a) PEO of molar mass $4 \times 10^6$.
(b) Propylene carbonate.
(c) an oxymethylene linked polyethylene glycol polymer of weight average molar mass $3 \times 10^5$ and repeat unit $[(CH_2CH_2O)_aCH_2O]$ where a had an average value of 9.
(d) lithium trifluoromethane sulphonate $LiCF_3SO_3$.

The component (c) was prepared by the method described in GB-2164047A, i.e. by reaction of poly (ethylene gycol) of a molecular weight sufficient to give an appropriate value of a with dibromomethane or dichloromethane in the presence of potassium hydroxide.

The mole ratio of polyethylene glycol to dibromomethane can be varied about 1:1 and the potassium hydroxide concentration altered in order to obtain the highest weight average molar mass of polymer. Using this method a polymer of molar mass about $3 \times 10^5$ was obtained, having an average a of about 9.

All manipulations of the components and dried final products were performed under an inert atmosphere of nitrogen.

The four components above were introduced into a flask in the weight ratios (a) 16.4%, (b) 26.2%, (c) 43.4% and (d) 14.1%, and sufficient acetone was added to dissolve the components, forming a clear colourless solution. Slight warming may be necessary to achieve this. (Alternately the salt(s) may be dissolved with the PEO in acetone and the plasticiser(s) and component (c) separately dissolved in acetone, and the solutions combined to form a homogeneous electrolyte solution). A layer of this solution was cast onto the lower of a pair of steel electrodes forming part of a variable temperature conductivity cell. The residual acetone was removed under reduced pressure to leave a uniform film of the polymeric material, which was subsequently pressed to a film of thickness of about 200 μm between the electrodes.

At $-20°$ C. a conductivity of approximately $1 \times 10^{-5}$ $S$ $cm^{-1}$ was recorded for the film.

The temperature dependency of the film conductivity is recorded in FIG. 1.

EXAMPLES 2 and 3

Following the pattern of Example 1 a pair of electrolyte formulations were prepared using the components:
(a) PEO of molar mass $4 \times 10^6$
(b) Propylene carbonate ('PC')
(c) oxymethylene linked polyethylene glycol (400) of average molar mass $3 \times 10^5$ and repeat unit $[(CH_2CH_2O)_aCH_2O]_n$ where a has an average value of 9.
(d) $LiCF_3SO_3$ using acetone as the casting solvent. The following molar ratios were used:

EXAMPLE 2:
(a) $2 \times PEO$
(b) $1 \times$ propylene carbonate
(c) $4 \times [(CH_2CH_2O)_aCH_2O]_n$
(d) to give a blend formula: $\{2PEO+PC+4[(CH_2CH_2O)_aCH_2O]_n\}20LiCF_3SO_3$ EXAMPLE 3:
(a) $1 \times PEO$
(b) $1 \times$ propylene carbonate
(c) $2 \times [(CH_2CH_2O)_aCH_2O]_n$
(d) $LiCF_3SO_3$ to give a blend formula: $\{PEO+PC+2[(CH_2CH_2O)_aCH_2O]_n\}20LiCF_3SO_3$ The results of $Log_{10}$ conductivity (sigma/S cm$^{-1}$) vs 1/temperature are shown in FIGS. 2 and 3 respectively.

Figure 2:
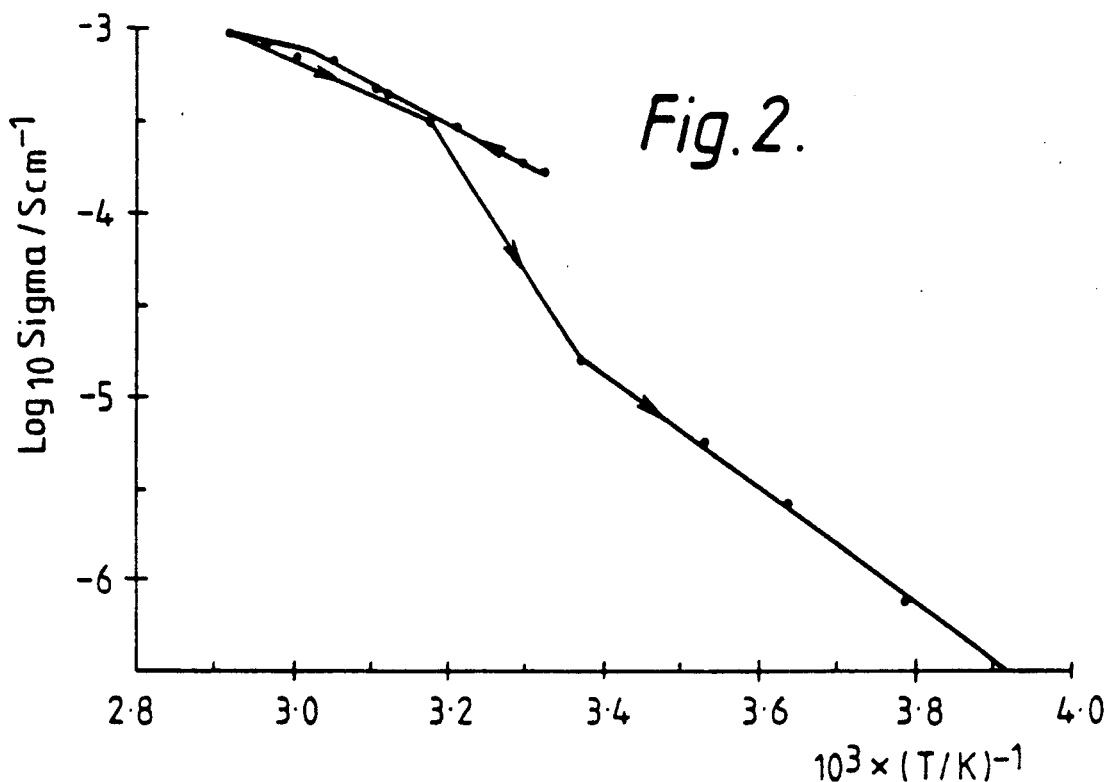
Figure 3:
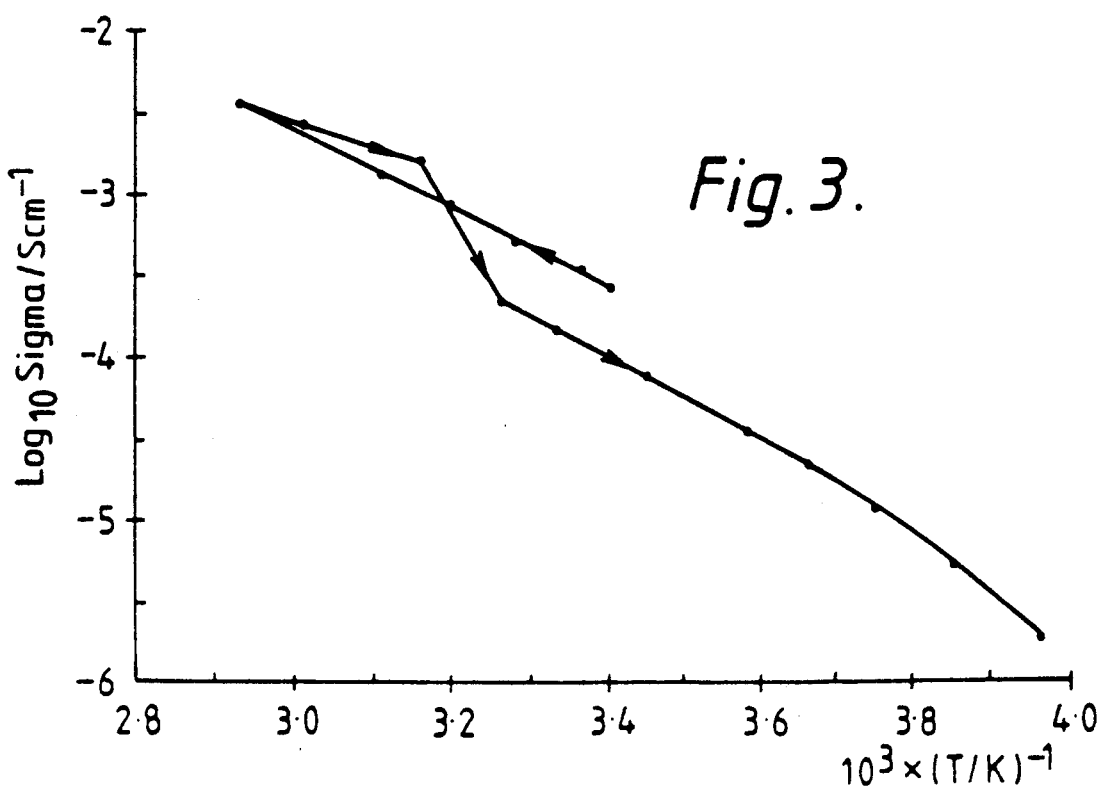

In FIGS. 2 and 3 lines have been drawn through the points to indicate the direction of temperature change. For both examples a small conductivity step at 30° to 40° C. is detectable, consistent with a phase change. PEO crystallisation/melting. This effect is favourably much reduced in comparison to usual (PEO+salt) electrolytes where a $10^2$ to $10^3$ S cm$^{-1}$ decline in conductivity is typical.

EXAMPLES 4 AND 5

Electrolytes were prepared in a similar manner to that of example 1 with acetone as the casting solvent, and components:
(a) PEO of molar mass $4 \times 10^6$
(b) propylene carbonate and ethylene carbonate ('EC')
(c) $[(CH_2CH_2O)_aCH_2O]_n$, a having an average value of 9
(d) $LiCF_3SO_3$ The following molar ratios were used:
EXAMPLE 4:
(a) $1 \times PEO$
(b) $1 \times (1:1\ PC:EC)$
(c) $2 \times [(CH_2CH_2O)_aCH_2O]_n$
(d) $LiCF_3SO_3$ to give an electrolyte: salt molar ratio of 20:1

EXAMPLE 5:
(a) $2 \times PEO$
(b) $1 \times (1:1\ PC:EC)$
(c) $4 \times [(CH_2CH_2O)_aCH_2O]_n$
(d) $LiCF_3SO_3$ to give an electrolyte: salt molar ratio of 20:1.

Figure 4:
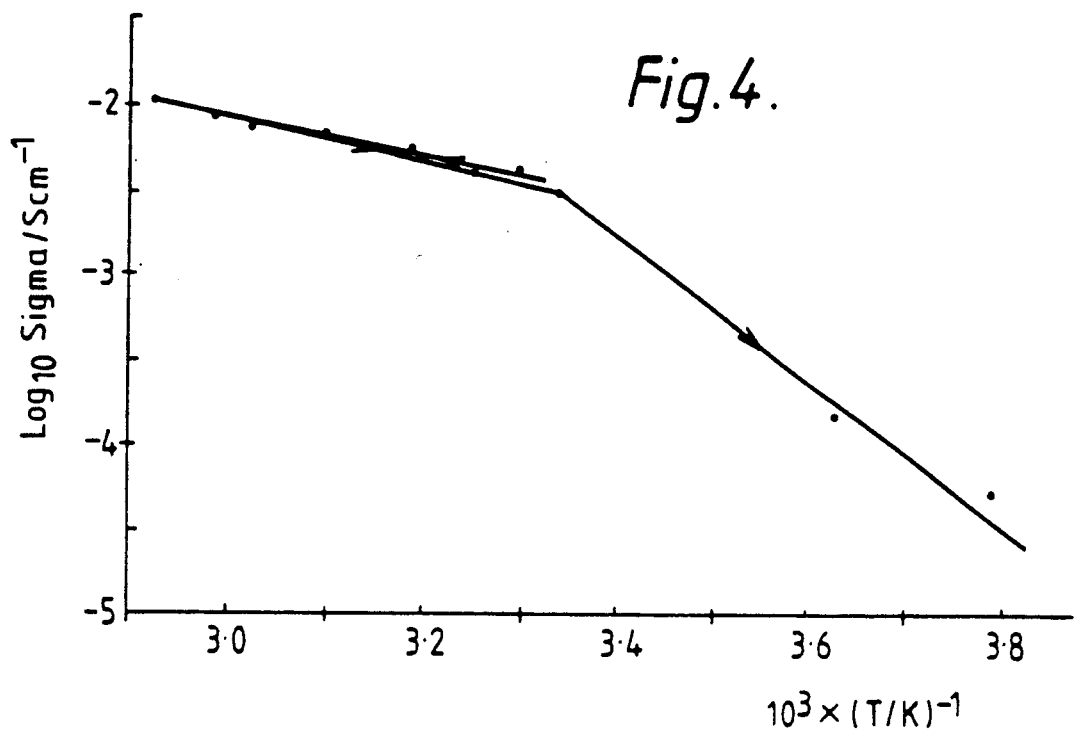
Figure 5:
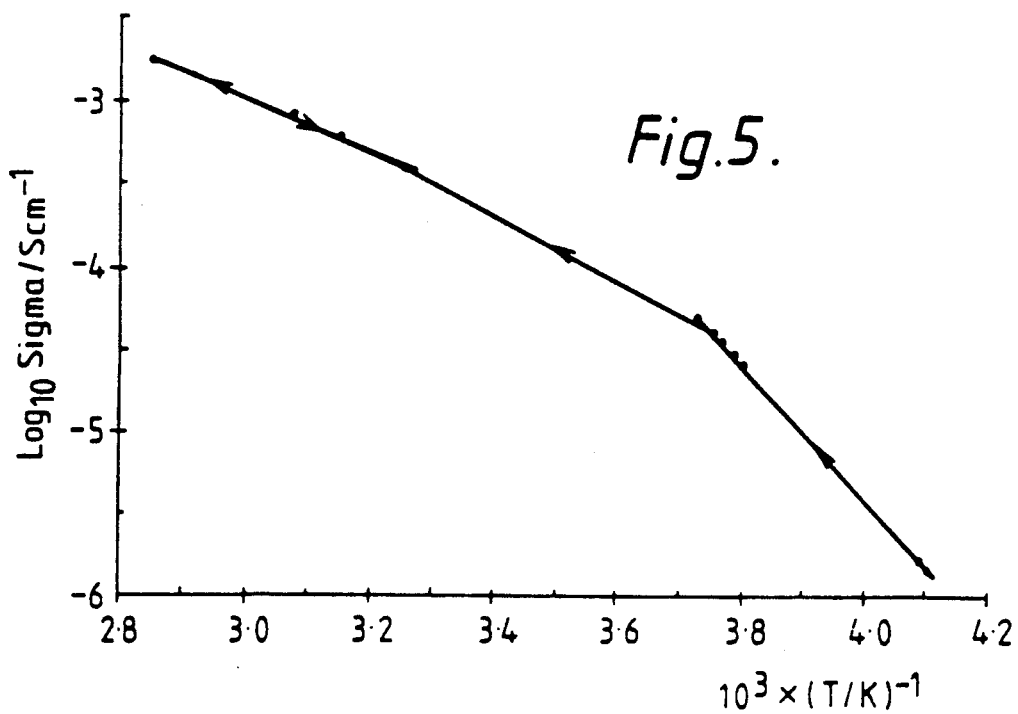

The results of $Log_{10}$ conductivity vs 1/temperature are shown in FIGS. 4 and 5 respectively. For example 4, conductivity of $1 \times 10^{-3}$ S cm$^{-1}$ at 20° C. was recorded.

Polymer electrolytes embodying the invention may be incorporated in an electrolytic cell as shown in FIG. 6 A film 21 of the polymer electrolyte is sandwiched between an anode 22 preferably of lithium metal or a lithium alloy, e.g. an alloy with silicon or aluminium, and a cathode 23 comprising e.g. $TiS_2$ and carbon preferably with an added proportion of the electrolyte. The anode 22 and cathode 23 are conventional as is the encapsulation of the cell and/or its assembly within a battery (not shown in FIG. 6). The cell may for example be made up using the techniques described in U.S. Pat. No. 4,303,748.

I claim:

1. An ion conducting polymeric material consisting essentially of the following components:
    a structural material;
    a least one plasticizer;
    an ion-solvating polymer;
    and optionally containing at least one ionic salt, all of these components being present in admixture; wherein the structural material is poly(ethylene oxide) and the ion-solvating polymer is oxymethylene-linked polyethylene glycol having a repeat sequence $(CH_2CH_2O)_aCH_2O$ in which a has an average value of 4 to 10.

2. The ion conducting polymeric material as claimed in claim 1 wherein the poly(ethylene oxide) structural component has a molar mass in the range of $1 \times 10^6$ to $5 \times 10^6$.

3. The ion conducting polymeric material as claimed in claim 1 wherein the ion-solvating polymer has an average value of a of 4 to 9.

4. The ion conducting polymeric material as claimed in claim 1 wherein the oxymethylene-linked polyethylene glycol has a molar mass in the range of $1 \times 10^5$ to $6 \times 10^5$.

5. The ion conducting polymeric material as claimed in claim 1 containing at least one ionic salt wherein the ionic salt is a salt of a strong acid anion with a metal ion or a stable cationic complex.

6. The ion conducting polymeric material as claimed in claim 5 containing at least one ionic lithium salt.

7. The ion conducting polymeric material as claimed in claim 6 wherein the lithium salt is selected from the group consisting of $LiCF_3SO_3$, $LiPF_6$, $LiClO_4$ or $LiAsF_6$.

8. An electrolytic cell comprising an anode and a cathode with an electrolyte interposed therebetween, wherein the electrolyte is the polymeric material as claimed in claim 1.

9. A battery consisting of a plurality of cells as claimed in claim 8.

* * * * *